(12) United States Patent
Shelby et al.

(10) Patent No.: US 6,562,276 B1
(45) Date of Patent: May 13, 2003

(54) PROCESS FOR FORMING A MULTILAYER, COINJECTED ARTICLE

(75) Inventors: Marcus David Shelby, Kingsport, TN (US); Lavonna Suzanne Buehrig, Gray, TN (US); Benjamin Bradford Gamble, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/516,311

(22) Filed: Mar. 1, 2000

Related U.S. Application Data (63) Continuation-in-part of application No. 09/378,262, filed on Aug. 20, 1999, now abandoned.
(60) Provisional application No. 60/097,246, filed on Aug. 20, 1998.

(51) Int. Cl.[7] ............................................... B29C 45/00
(52) U.S. Cl. .................................................... 264/328.8
(58) Field of Search ........................... 264/328.8, 328.1; 425/130

(56) References Cited

U.S. PATENT DOCUMENTS

| | | | |
|---|---|---|---|
| 4,267,301 A | | 5/1981 | Olsen et al. |
| 4,383,101 A | | 5/1983 | Olsen et al. |
| 4,440,922 A | | 4/1984 | Barbee et al. |
| 4,518,557 A | * | 5/1985 | Wecker .................. 264/173.14 |
| 4,552,948 A | | 11/1985 | Barbee et al. |
| 4,604,257 A | * | 8/1986 | Smith et al. ........... 264/331.21 |
| 5,202,074 A | * | 4/1993 | Schrenk et al. ............. 264/241 |
| 5,380,479 A | * | 1/1995 | Schrenk et al. ............. 264/241 |
| 5,540,878 A | * | 7/1996 | Schrenk et al. ............. 264/512 |
| 5,628,950 A | * | 5/1997 | Schrenk et al. ............. 264/241 |
| 5,679,453 A | | 10/1997 | Konagaya et al. |
| 5,804,016 A | * | 9/1998 | Schmidt et al. ............. 156/242 |
| 6,187,241 B1 | * | 2/2001 | Swenson ..................... 264/255 |

FOREIGN PATENT DOCUMENTS

| | | | |
|---|---|---|---|
| DE | 2160118 A | | 3/1977 |
| DE | 240564 A | * | 9/1979 |
| DE | 3534407 | | 4/1987 |
| JP | 75010196 B | | 4/1975 |

OTHER PUBLICATIONS

Han, C. D., "Rheology in Polyer Processing", Academic Press, XP–002124158, pp. 263–283 (1987).*
Eigl F.A. et al., "Mehr Verstandnis Fur Den Kern", Kunststoffe, De, Carl Hanser Verlag Munchen, vol. 88, No. 1, pp. 46–48, 50 XP000729799.
Bichler, M. et al., "Multilayer–Preforms", vol. 87, No. 10.

* cited by examiner

*Primary Examiner*—Mark Eashoo
(74) *Attorney, Agent, or Firm*—Needle & Rosenberg, PC.

(57) ABSTRACT

A process for coinjection-molding a multilayer article comprising coinjecting at a selected coinjecting temperature (i) a first outer polymer resin layer having a viscosity at the selected coinjecting temperature, and (ii) a second inner polymer resin layer having a viscosity at the selected coinjecting temperature, wherein the ratio of the outer polymer resin viscosity to the inner polymer resin viscosity at the coinjecting temperature is less than or equal to about 2 and the coinjecting temperature is above the melting temperature of the highest melting resin and below the degradation temperature of the lowest degrading resin to form a multilayer article. Processes for coextrusion are also provided.

28 Claims, 5 Drawing Sheets

PROCESS FOR FORMING A MULTILAYER, COINJECTED ARTICLE

RELATED APPLICATION

This application is a continuation-in-part application of U.S. Ser. No. 09/378,262, filed Aug. 20, 1999, now abandoned, which claims priority to provisional patent application Ser. No. 60/097,246, filed on Aug. 20, 1998, both of which are incorporated herein by this reference in its entirety.

FIELD OF THE INVENTION

This invention relates generally to a process comprising coinjecting or coextruding a structural polymer resin with one or more performance polymer resins to a form a multilayer article without melt flow defects.

BACKGROUND OF THE INVENTION

Poly(ethylene terephthalate) (PET) is an established bottle polymer that produces rigid bottles with excellent clarity and gloss. These containers are manufactured by a process that comprises drying the PET resin, injection molding a preform and, finally, stretch blow molding the finished bottle.

The injection molding of PET preforms requires the melting of polymer pellets and the injection of the molten, viscous PET material into a cavity, which also has a core rod. The molten PET forms a "skin" where it comes into contact with the cold cavity wall and core rod. This skin is composed of "frozen" PET and will remain fairly stationary throughout the remainder of the injection molding process.

At points extending radially inwardly away from the cavity wall and, outwardly from the core rod, or at the points at which the polymer does not directly contact the cavity wall or core rod, the polymer (which is still elevated in temperature) remains a viscous, flowing mass. This hot inner viscous material can still flow relative to the frozen skin layer although its viscosity increases as it continues to cool. Thus, a temperature transition region occurs in the radial direction as well as a corresponding melt viscosity transition (because of PET's viscosity dependence upon temperature). Regardless of the changes in melt viscosity as a function of radial distance from the skin, monolayer PET is, for the most part, unaffected by the shear that develops between the frozen skin of the PET and the molten polymer that pushes past it. After the entire cavity has been filled using this process, the polymer is held in the cavity until the preform has become sufficiently cool so that it can be blown immediately into a bottle or the preform is cool enough to be ejected. Cooled preforms that have been ejected are stored for later reheat blow molding into the final product.

Using this process, PET resin is used in a wide range of applications such as carbonated soft drink, hot-filled juice products and warm-filled foods. However, PET has insufficient barrier to meet the desired shelf lives of products with more demanding gas barrier needs.

In one particular application, in order to increase the gas barrier of a PET bottle, it is possible to inject a barrier layer into or onto a preform during the injection molding process. This barrier layer is injected into or onto the melt flow stream of the PET such that the barrier polymer resin flows past the skin of PET previously injected. This "coinjection" process allows two resins to be injected into a "multilayer" preform that can be blown to form the final bottle product.

Unfortunately, it has been found that the coinjection of a barrier polymer resin with PET can result in defects in the PET preform. A commonly observed melt flow defect is small "pulls," frequently called chevrons because of their V shape. Chevrons are interfacial instabilities that occur between layers. Chevrons detract from the aesthetics of the finished article.

One barrier resin that may be used in a multilayer process is an ethylene-vinyl acetate copolymer (EVOH) modified with various levels of ethylene ("grades"). It is commonly known that these "grades" of barrier resins have different melt viscosities and melting points. Generally, it would be desirable to match both the melt viscosity of the barrier resin and the melt temperature of the barrier resin to the PET being used. Unfortunately, the commercially available EVOH (regardless of the grade) has a melt viscosity and degradation temperature far below that of commercially available PET. In addition, heat transfer from the hotter PET layer will further heat the EVOH above its desired processing temperature and result in even lower melt viscosity of the barrier resin during injection molding.

Most of the technology for coinjection is relatively new and is just becoming commercially viable for molding multilayer articles or preforms on a large scale. In addition, coinjection for most practical purposes is focused almost solely on the use of PET (or a copolymer thereof) as the structural resin for preform molding applications. In contrast, coextrusion is a well-established technique that is commonly applied to a wide variety of different polymers (e.g., PET, copolyesters, polyolefins, PVC, styrenics, nylons, etc.) and for a much wider range of applications.

In coextrusion, multilayer film or sheet is produced as opposed to a molded article. As with coinjection, there is one or more "structural" layers combined with one or more "performance" layers. The structural layers are usually (but not always) cheaper than the performance layers and are included to keep total cost down (since performance layers can often be expensive). Examples of coextrusion include the use of a barrier layer in packaging film, the use of a UV protecting layer on the outside layer of heavy gauge sheeting for outdoor weathering protection, the use of regrind in the center to reduce costs, the use of adhesive/sealing layers on the outside surface, and the use of glossy and/or pigmented layers to change the overall aesthetics of the film/sheet. Unlike the coinjection example cited above, the "performance" layer in coextrusion does not necessarily have to be on the inside of the multilayer structure.

In the process of coextrusion, the various resins are first melted in separate extruders and then brought together in a feedblock-a feedblock being nothing more than a series of flow channels which bring the layers together into a uniform stream. From this feedblock, this multilayer material then flows through an adapter and out a film die. The film die can be a traditional flat film/sheet die (e.g., a coathanger die) or it can be an annular die as is used in blown film. Coextrusion is also used making more complicated shapes like profiles. When we refer to coextrusion in this document, it is implied that all of these other coextrusion applications are also covered in addition to traditional film/sheet applications.

As with coinjection, coextrusion often suffers with the problem of chevrons and other visual defects. These defects in coextrusion and coinjection both result from high shear stresses developing at the layer interface during flow. These stresses are a function of the viscosities of the layers in addition to the relative position and thickness of the layers. In fact, knowledge gained from coextrusion can be used to help minimize the flow defects in coinjection.

In addition, coextrusion of flat film often suffers from the problem of poor layer distribution across the width of the sheet. For example, if one were to take a piece of coextruded film (for example, an A/B/A structure) and separate the layers, they might find that one of the A layers would be much thicker near the outer edges of the sheet, and very thin in the middle. The B layer would be just the opposite, that is, being thin near the edges and thick in the middle. Usually, it is desired that the layers be uniform in thickness across the full width of the sheet so that properties (e.g., barrier, color, stiffness, etc.) do not vary across the width.

Up until now, correcting these two coextrusion problems (poor layer distribution uniformity and flow defects) has really been more of an art than science. There have been some attempts to balance the viscosities of the resins (i.e., having a viscosity ratio close to one) to improve layer distribution, but this has met with only limited success. Thus, there exists a need for a process to properly select both the resin viscosity and elasticity parameters and the processing conditions in coextrusion such that both the interfacial instabilities (i.e., visual defects like chevrons) and poor layer distribution are eliminated.

In the coextrusion process according to this invention, therefore, the "elasticity" of the various resin layers is as important as the resin viscosity and proper balancing of both the elasticity ratio and the viscosity ratio simultaneously is needed in order to have a uniform layer distribution and form a multilayer article. A process has thus been developed so that processing conditions and resins can be to optimized to eliminate these multilayer flow problems.

Because the multilayer flow behavior is very similar for both coinjection and coextrusion, the method can be effectively applied for both applications. As a result, the process of the present invention forms a high quality coinjected multilayer article or preform as easily as it forms a multilayer coextruded film structure.

SUMMARY OF THE INVENTION

The present invention relates to the elimination of melt flow defects such as chevrons from coinjected and/or coextruded articles by minimizing the interfacial stress between layers, such as between a structural layer (e.g., PET) and a performance (e.g., barrier) layer, in a multilayer molded structure or article.

In addition, the present invention relates to the matching of viscoelastic flow properties of the respective layers so that layer distribution is maintained in a uniform fashion for coextrusion and coinjection applications.

As embodied and broadly described herein, this invention, in one embodiment, relates to a process for coinjection-molding a multilayer article. The process comprises coinjecting at a selected coinjecting temperature (i) a first outer polymer resin layer having a viscosity at the selected coinjecting temperature, and (ii) a second inner polymer resin layer having a viscosity at the selected coinjecting temperature, wherein the ratio of the outer polymer resin viscosity to the inner polymer resin viscosity at the coinjecting temperature is less than or equal to about 2 and the coinjecting temperature is above the melting temperature of the highest melting resin and below the degradation temperature of the lowest degrading resin to form a multilayer article.

In another embodiment, the present invention comprises a process for coextruding a multilayer article comprising coextruding at a selected coextruding temperature (i) a first outer polymer resin layer having a viscosity at the selected coextruding temperature, and (ii) a second inner polymer resin layer having a viscosity at the selected coextruding temperature, wherein the ratio of the outer polymer resin viscosity to the inner polymer resin viscosity at the coextruding temperature is less than or equal to about 2 and the coextruding temperature is above the melting temperature of the highest melting resin and below the degradation temperature of the lowest degrading resin.

In another embodiment, the present invention relates to a process for coinjection-molding a 5-layer article comprising coinjection-molding at a selected coinjecting temperature (i) two outer polymer resin layers having a viscosity at the selected coinjecting temperature, (ii) two intermediate polymer resin layers disposed between a core layer and the two outer layers, the two intermediate resin layers having a viscosity at the selected coinjecting temperature, and (iii) a core layer having a viscosity at the selected coinjecting temperature, wherein at each polymer resin interface the ratio of the outermost polymer resin viscosity to the next innermost polymer resin viscosity at the coinjecting temperature is less than or equal to about 2 and the coinjecting temperature is above the melting temperature of the highest melting resin and below the degradation temperature of the lowest degrading resin to form a 5-layer article.

In yet another embodiment, the present invention relates to a process for coextruding a 5-layer article comprising coextruding at a selected coextruding temperature (i) two outer polymer resin layers having a viscosity at the selected coextruding temperature, (ii) two intermediate polymer resin layers disposed between a core layer and the two outer layers, the two intermediate resin layers having a viscosity at the selected coextruding temperature, and (iii) a core layer having a viscosity at the selected coextruding temperature, wherein at each polymer resin interface the ratio of the outermost polymer resin viscosity to the next innermost polymer resin viscosity at the coextruding temperature is less than or equal to about 2 and the coextruding temperature is above the melting temperature of the highest melting resin and below the degradation temperature of the lowest degrading resin to form a 5-layer article.

Additional advantages of the invention will be set forth in part in the detailed description, including the figures, which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory of preferred embodiments of the invention, and are not restrictive of the invention, as claimed.

DETAILED DESCRIPTION OF THE INVENTION

The present invention may be understood more readily by reference to the following detailed description of the invention, including the appended figures referred to herein, and the examples provided therein. It is to be understood that this invention is not limited to the specific processes and conditions described, as specific processes and/or process conditions for processing molded articles as such may, of course, vary. It is also to be understood that the terminology used herein is for the purpose of describing particular embodiments only and is not intended to be limiting.

It must also be noted that, as used in the specification and the appended claims, the singular forms "a," "an" and "the" comprise plural referents unless the context clearly dictates otherwise. For example, reference to processing or forming an "article," "container" or "bottle" from the process of this invention is intended to comprise the processing of a plurality of articles, containers or bottles.

Ranges may be expressed herein as from "about" or "approximately" one particular value and/or to "about" or "approximately" another particular value. When such a range is expressed, another embodiment comprises from the one particular value and/or to the other particular value. Similarly, when values are expressed as approximations, by use of the antecedent "about," it will be understood that the particular value forms another embodiment.

Overview

The present invention relates to the elimination of melt flow defects such as chevrons from coinjected and/or coextruded articles by minimizing the interfacial stress between layers, such as between a structural layer (e.g., PET) and a performance (e.g., barrier) layer, in a multilayer molded structure or article. Preferably, these melt flow defects may be minimized while obtaining and retaining the preferred physical properties in the resulting article.

In addition, the present invention relates to the matching of viscoelastic flow properties (i.e., both the viscosity and elasticity properties) of the respective layers so that layer distribution is maintained in a uniform fashion for coextrusion and coinjection applications.

In one embodiment, it is possible to inject a barrier layer into a preform during the injection-molding process. The barrier layer is injected into the melt flow stream of PET (structural layer) such that the barrier resin flows past the skin (preferably on the inside) of the PET previously injected. Preferable barrier resins used in the multilayer process include EVOH modified with various levels of ethylene ("grades") and poly(m-xylylene adipamide) (MXD6). This "coinjection" process allows two resins to be injected into a "multilayer" preform that can be blown to form the final bottle product. However, it is commonly known that these "grades" of barrier resins have different melt viscosities and melting points. When wide differences in melt viscosity occur between PET and the barrier resin, the potential for formation of visible melt flow defects increases.

In addition, the viscosity ratio of the two polymers also plays an important role in the formation of visible defects. One example of a visible flow defect is a v-shaped chevron. Chevrons are interfacial instabilities that occur between layers when the shear stress at the interface exceeds a critical value. It is, therefore, desirable to match the melt viscosity of the barrier resin with the PET resin to eliminate visible defects, particularly chevrons.

To eliminate the visible defects, it is necessary to develop a set of processing conditions and carefully select a grade of PET or other structural polymer resin such that the melt viscosity and processing temperatures can be matched as closely as possible to the performance or barrier polymer resin. By more closely matching these parameters, the shear stress at the interface between layers can be reduced thereby producing a higher quality, more resilient and defect-free multilayer container. For example, a CHDM-modified PET with dramatically reduced I.V. may be selected so that it can be processed in such a manner that preforms and the resulting bottles can be produced without visual defects.

One embodiment of the present invention comprises minimizing the stress by balancing the structural polymer layer/performance polymer layer viscosity ratio in the coinjection and coextrusion processes. For example, the ratio of the viscosity of the structural polymer resin divided by the viscosity of the performance polymer resin is preferably less than or equal to about 2, and more preferably less than or equal to about 1 to form a multilayer shaped article without melt flow defects. Most preferably, the ratio of the structural resin melt viscosity to the performance resin melt viscosity is less than or equal to about 1 and greater than or equal to about 0.5. Widely differing viscosity ratios can lead to distortion of the shape of the interface as well as high interfacial stresses (the latter causing chevrons).

In the coextrusion of films and sheets, interfacial instabilities are more likely when the outer (cap) layer is very thin, typically less than 10% of the total thickness because the shear stresses during coextrusion are highest near the outer surface. To overcome this, and to minimize the stress and eliminate chevrons, the outer (cap) layer may have a slightly lower viscosity than the inner (core) layer. However, the viscosity ratio is still close to one. However, for a coinjection process, the situation is reversed. The outer layer(s) preferably comprises at least one suitable structural polymer resin with a very thin inner (core) layer(s) of a performance polymer resin. While stresses are naturally much lower in the middle of the flow channel where, typically, the performance resin layer flows, it is still possible for them to become high enough for chevrons to occur.

For purposes of this invention, when forming a multilayer article by a coinjection or coextrusion process, the outer or outermost resin layer of a multilayer material is defined as the layer that is closest to the surface of the metal wall(s), which define the flow channel. The metal wall(s) may typically include the surfaces of the mold wall and core pin, for example. Each subsequent layer toward the center line of the flow channel is considered an inner layer relative to the layer closer to the wall(s). In other words, for every interface of two or more layers, an outer layer is defined as the closest to the surface of any wall.

In contrast to coextrusion, it is preferable in coinjection if the inner preferably performance polymer resin has a viscosity that is equal to or slightly higher than the viscosity of the structural polymer resin (with the viscosity ratio still being within the above-defined ranges). Currently, for example, the viscosity of EVOH is much less than that of PET at the processing temperatures used, which greatly contributes to the formation of chevrons.

Both viscosity and elasticity will vary with temperature. Therefore, it is important to select processing conditions which (a) most closely match the optimum viscosity and elasticity temperatures of the selected resins and (b) are within known resin constraints, such as the melting point and degradation temperature for each of the selected polymers. In fact, according to the processes of this invention, the coinjecting or coextruding temperature should be above the melting temperature of the highest melting polymer resin used, which may or may not be the structural or performance polymer resin. Further, the coinjecting or coextruding temperature should be below degradation temperature of the lowest degrading polymer resin, which may or may not be the structural or performance polymer resin.

It should be appreciated that for many structural/performance resin combinations there will be more than one set of suitable processing temperatures within the ranges of the present invention. This is highly desirable as it allows for optimization on varying molding and extruding equipment. Thus, it is desirable to choose a set of optimum elasticity and viscosity temperatures that are within the polymer resin set constraints and are reasonably close together or matched, and provide an elasticity and viscosity ratio within the range of the present invention.

Viscoelastic Parameters

In order to apply the processes described herein, it is first necessary to define the viscoelastic properties of each layer as a function of temperature. The viscoelastic properties are viscosity and elasticity. Both of these parameters decrease with increasing temperature and at varying rates depending on the type of polymer (polymer I.V., $M_w$, etc.).

The viscosity is simply the ratio of the shear force exerted by a fluid divided by the applied shear rate. More viscous fluids like honey or oil have a greater resistance to flow than less viscous fluids like water. In contrast, "elasticity" is a measure of the "memory" or "rubberiness" of a fluid. A highly elastic fluid, after deformed, will try to return to its original undeformed shape once the stress is removed. A rubber band is an extreme example of a highly elastic material. In contrast, a material with no elasticity (e.g., a purely viscous fluid like water) will have no memory of its original shape and will not try to "snap back" to its original shape after the stress is removed.

Polymers fall in between the two extremes of purely elastic (e.g., a rubber band) and purely viscous, with the degree of elasticity depending on such things as the molecular weight, degree of chain entanglement, etc. Polymers also have what is known as a "fading memory". In other words, the polymer's memory of a stress event will gradually decrease with increasing time. So if one applies a stress to a polymer with a fading memory and waits a long time before releasing, the polymer will have little or no "snap back" because its memory of the event is gone. The time that it takes for most of the memory to fade is called the "relaxation time" and is denoted as $\lambda$. For purposes of this invention, relaxation time is used as a measure of "elasticity."

Elasticity is important in coextrusion or coinjection processing in particular because every time a polymer undergoes a change in flow condition (which results in a change in stress), the polymer retains some memory of that stress which affects its flow further downstream. For example, the hot runners that connect the extruder and injection mold often have a 90 degree elbow in the piping to change the direction of the flow. This elbow also imparts a different stress to the polymer as it goes around the bend. If the time it takes for the polymer to flow from the bend to the gate is less than the relaxation time $\lambda$, then the stresses in the bend will still be remembered by the resin which consequently can affect the flow in the mold. In some cases, this can lead to the polymer preferentially and non-symmetrically filling up one side of the preform mold. This affects cooling behavior and possibly even layer distributions for multilayer preforms. For coextrusion, the imparted stresses occur when the layers are first brought together in the feedblock and continue at different points as the polymer flows through the adapter and then into the die. Because of the differences in elasticity between the different layers in a multilayer flow, the elastically induced stresses at the interface will cause gradual rearrangement of the interface as it flows down the channel.

Therefore, the longer the relaxation time, the more rubbery (as opposed to liquid-like) the polymer will behave. The elasticity ratio should fall roughly within the same range as the viscosity ratio. However, it is preferred to have the elasticity ratio be approximately or equal to the reciprocal of the viscosity ratio to offset or balance the tendency of the mismatched polymer viscosities, which may create non-uniform layers. One method of quantifying the reciprocal value and for defining a range that is acceptable in the processes of this invention is to require that $$-0.2 < \log 10(\text{elasticity ratio}) + \log 10(\text{viscosity ratio}) < 0.2$$

In this range, the variation in layer thickness is less than about 25% from center to outer edge for a coextruded structure. In the above equation, if the elasticity ratio is the exact reciprocal of the viscosity ratio, then the above term equals 0. However, this value may range from –0.2 to 0.2 with a more preferred range from –0.1 to 0.1, which gives about +/–10% on the thickness variation.

Thus, in one embodiment of the present invention, the ratio of the elasticity of the structural polymer resin to the elasticity of the performance polymer resin is preferably between 0.5 and 2, and more preferably equal to or slightly greater than 1, the more preferred case stemming from the fact that the preferred viscosity ratio is slightly less than 1. As the elasticity ratio begins to deviate excessively from the reciprocal of the viscosity ratio, layer thickness non-uniformity will become severe. Also, the die swell of each polymer as it exits the injector nozzle and enters the mold is a strong function of its relaxation time. Therefore, a balanced elasticity ratio between the structural (e.g., PET) and performance (e.g., EVOH barrier) resins will lead to similar die swells that improve flow and layer uniformity.

The melt viscosity, elasticity, and processing temperatures for commercially available EVOH barrier resins, for example, have been predetermined. It is, therefore, desirable to develop a set of processing conditions and carefully select a grade of PET such that the melt viscosity, elasticity, and processing temperatures can be matched as closely as possible to the performance resin in order to eliminate flow defects (such as chevrons) from occurring and to keep the layer thickness distribution uniform. Thus, the shear stress at the interface between layers can be reduced producing a higher quality, more resilient and defect-free multilayer article or container.

Polymer melt viscosities are known to be proportional to $M_w^{3.4}$, where $M_w^{3.4}$ is the weight average molecular weight. Because $M_w$ is directly related to I.V., melt viscosity is therefore directly proportional to $I.V.^{5.1}$, where $I.V.^{5.1}$ is measured in 60/40 phenol/tetrachloroethane at 25° C. Thus, by reducing the I.V. of the PET resin, for example, the melt viscosity can also be decreased.

Polymer relaxation times will also decrease with decreasing I.V., so it is important to try to balance both the viscosity and elasticity ratios at the same time. Usually this involves a tradeoff in that both ratios may not be made to exactly equal 1. Thus, for coextrusion, it is not necessary for both the viscosity and elasticity ratios to be the same, but it is preferable if the two ratios offset one another (the elasticity ratio should be the reciprocal to the viscosity ratio). In other words, if the elasticity ratio is slightly greater than one, then the viscosity ratio should be slightly less than one. This would lead to uniform interfaces between layers in coextrusion applications and it is likely that the same behavior holds true for coinjection. Having both ratios significantly less than one or both significantly more than one may lead to problems with layer uniformity.

The melt viscosity and elasticity of polyesters may be altered by modifying the polymer compositions, lowering the I.V. of the polyester, and/or by the careful selection of processing conditions for both polymers. Thus, those skilled in the art could readily produce polymers having the desired viscosity and elasticity ratios using the process of the present invention. For example, a CHDM-modified PET with a dramatically reduced I.V. can be coinjected with EVOH under appropriate processing conditions in such a manner that preforms and the resulting bottles can be produced without visual defects such as chevrons or other flow anomalies.

Estimation of the Viscosity and Elasticity (or Relaxation Time)

Estimation of the viscoelastic parameters for a resin requires the appropriate rheological test data. In the present invention, frequency sweeps on a cone and plate rheometer are used to obtain dynamic viscosity information on the polymer melt. This test, which is well known in the art, provides a complex viscosity $\eta^*$, a storage modulus G' and a loss modulus G", all as a function of the oscillation frequency $\omega$.

Figure 1:
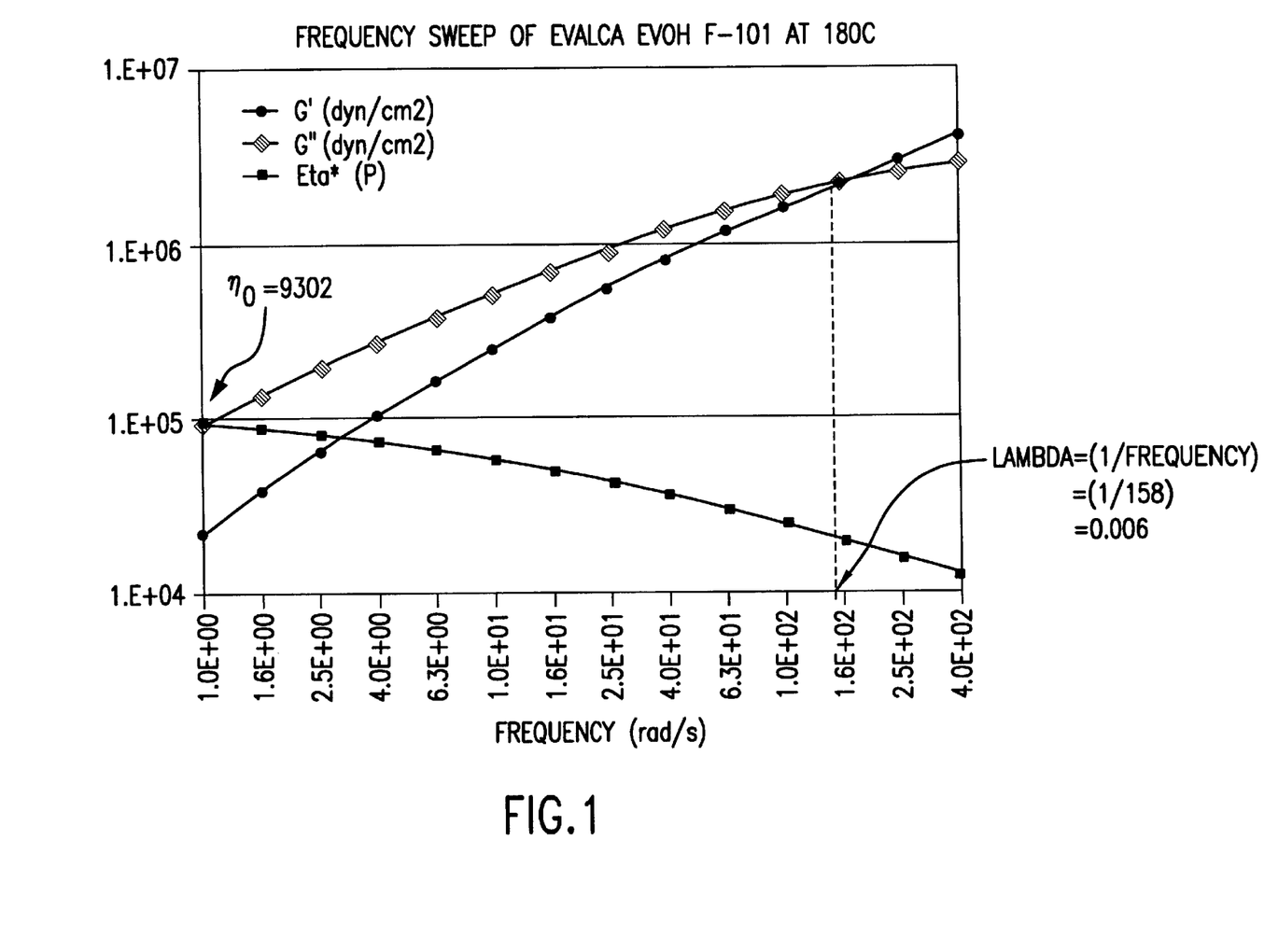
FIG. 1 is a plot of a frequency sweep to determine dynamic viscosity data for EVOH at 180° C.

An example set of data is shown in FIG. 1 for EVOH at 180° C. For purposes of the detailed description, the complex viscosity $\eta^*$ is approximately the same as the steady shear viscosity $\eta$. Similarly, the oscillation frequency is approximately the same as the shear rate for a steady shear test. The storage modulus G' is a direct measure of the "rubberiness" of the polymer, whereas G" is related to the amount of viscous dissipation (similar to the viscosity).

For coextrusion/coinjection optimization, the relaxation time $\lambda$ and the zero shear viscosity $\eta_o$ are extracted. One method of extraction is to fit all of the data to one of many constitutive equations available in the literature. However, an easier method is to estimate the parameters graphically. The zero shear viscosity $\eta_o$ can be estimated by extrapolating $\eta^*$ to very small values of $\omega$ (this has a value of 93020 poise in FIG. 1). For purposes of this description, we will refer to the fitted value of $\eta_o$ as simply $\eta$, although it should be understood by the reader that the true steady shear viscosity $\eta$ is really frequency (or shear rate) dependent. To estimate $\lambda$, the frequency $\omega^*$ where G' and G" intersect must be found. The relaxation time $\lambda$ can then be approximated as $1/\omega^*$ where, for this EVOH example, we get a value of 0.006 s.

Because both $\lambda$ and $\eta$ vary with temperature, it is important to repeat this dynamic viscosity measurement at different temperatures. At least 3 sweeps for each resin are usually performed. The parameters $\eta$ and $\lambda$ can both be curve fit to an Arrhenius type of equation with activation energy $E_a$ having the form:

$\eta = A \exp(Ea/RT)$ $\lambda = B \exp(Ea/RT)$ where A and B are front factors, T is temperature and R is the gas constant. Once values of A, B, and $E_a/R$ are fitted, the viscosity ratio and elasticity ratio for any two polymers at any given set of melt temperatures can be calculated.

Factors for Forming Coinjected or Coextruded Articles

Some factors to consider when forming a multilayer article that has minimal interfacial instabilities (i.e., chevrons, wavy lines, etc.) according to this invention include, but are not limited to the following:

1. Interfacial instabilities occur when the shear stress at the interface between two layers exceeds a certain critical value (this value depends on the resins involved). Thus, by keeping the stress at the interface to a minimum during coinjection or coextrusion, the instabilities can be eliminated.

Figure 2:
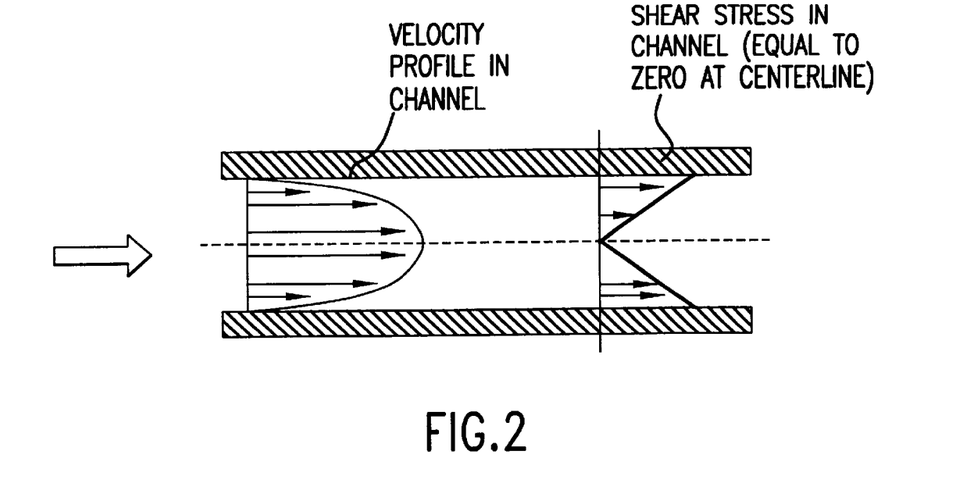
FIG. 2 is a schematic diagram of velocity and shear stress profiles in a polymer resin flow channel.

2. Shear stresses increase as the shear rate increases. Because of the shape of the velocity profile in the flow channel, the shear rate tends to be a maximum near the wall (this can be the die wall in a coextruded structure or the mold wall in coinjection) and zero near the center of the flow channel (see FIG. 2). As a result, shear stresses are highest near the wall and lowest at the center. Thus, the closer the interface is to the wall surface, the more likely the interfacial stress will exceed the critical stress such that visual defects form. Interfaces near the center of the flow channel are unlikely to develop flow instabilities because the stress is low. Thus, where the application allows (not all do), it is preferred to have the interface as close to the center as possible.

3. Shear stresses are also increased when the outermost layer is at a higher viscosity than the next innermost layer. Therefore, by maintaining viscosities where the outer layer is at a lower viscosity than an inner layer, the stresses are minimized and the instabilities are minimized. The closer the interface is to the mold wall, the lower the viscosity of the more outer layer should be.

4. Shear stresses can also be reduced by lowering the flow rate of polymer through the die (or the rate at which it is injected into the mold). However, lowering the flow rate implies a reduction in line speed, which is not economically attractive.

5. Coextrusion often involves having the "performance" layer as a thin cap layer on the outside of the sheet (e.g., for UV block, higher gloss, heat sealing, etc.). As a general rule, whenever this cap layer is less than about 10% of the total sheet thickness, the interfacial stress is likely to be high enough to cause instabilities. Thin cap layers are also believed to cause layer "wavy line" oscillations that start in the feedblock as opposed to the die. They occur when the angle of impingement of the flow channels is too high. They can usually be alleviated by bringing the layers together more gradually (i.e., a smaller impingement angle) and by keeping the outer layer viscosity low just as with the regular flow instabilities. Thus methods for reducing regular flow instabilities described herein also help to eliminate the wavy lines.

6. During coextrusion, the interfacial instabilities are most likely to start to form in the die land region just before reaching the die lips. This is because the flow channel is narrowest there and the stresses are higher. In contrast, the wavy lines mentioned previously usually start at the impingement point in the feedblock or coinjection channel.

7. Unlike coextrusion, coinjection rarely involves that the "performance layer" be added as a thin cap layer on the outer edge. Thus, it would seem that the problems of instabilities should be minor. However, coinjection involves much higher shear rates than coextrusion, so the interfacial stresses can be significantly high, even far removed from the mold wall. In addition, the polymer is being rapidly cooled from the wall surface inward, which effectively narrows the flow channel as polymer solidifies and thus raises the stresses even further. As mentioned before, the closer the coinjected barrier layer is to the centerline, the less likely that instabilities will form.

DETAILED DESCRIPTION OF THE EMBODIMENTS

1. Coinjection

In one embodiment for forming a multilayer article by a coinjection process according to this invention, the ratio of viscosity for an outermost layer (A), which is closest to the mold wall and typically called a "cap" layer, over the next innermost layer (B), which is closer to the center and typically called a "core" layer, should be less than or equal to ($\geqq$) about 2. In other words, $\eta(A)/\eta(B) \leqq 2$ where $\eta$ is viscosity, $\eta(A)$ is the outermost layer viscosity and $\eta(B)$ is the next innermost layer viscosity. A more preferred embodiment is where $\eta(A)/\eta(B)$ is greater than or equal to about 0.5 and less than or equal to about 1 ($0.5 \leqq \eta(A)/\eta(B) \leqq 1$).

For most, but not all coinjection applications, the structural resin (e.g., PET) will be resin A (the outermost layer) and resin B will be the inner barrier layer since it is near the center. In a similar manner to coextrusion, if the barrier layer is in the center of the wall, then $\eta(A)/\eta(B)$ is preferred to be closer to 1. As the barrier layer location moves closer to the wall, then $\eta(A)/\eta(B)$ should get smaller, preferably approaching 0.5.

However, other numerous multilayer embodiments are contemplated by this invention. For example, a multilayer article of this invention may be prepared from a coinjection of 5 layers where (starting from one side) the layers are arranged as follows: PET/EVOH/PET regrind/EVOH/PET. In this example, the $\eta(PET)/\eta(EVOH) \leqq 2$ and $\eta(EVOH)/\eta(PET\ regrind) \leqq 2$. Preferably, each ratio is from 0.5 to 1.

Thus, to form the above 5 layered article, $\eta(PET) \leqq \eta(EVOH) \leqq \eta(PET\ regrind)$. Unfortunately, this is not always easy since the regrind PET is usually at a lower I.V. (and thus lower viscosity) than the regular PET. Nevertheless, this is the optimum condition that will give the best preform (or coextruded film) with no chevrons and/or instabilities. Further, since the viscosities are temperature dependent in that the viscosity decreases with increasing temperature, the various processing temperatures to help achieve the conditions above may be changed (e.g., PET regrind may run colder to increase its viscosity).

It must also noted that having the viscosity ratio of $\eta(A)/\eta(B)$ of less than or equal to 2, more preferably of less than or equal to about 1, helps reduce pumping pressures because the less viscous fluid near the wall is serving as a lubricant.

In another embodiment, a multilayer article of this invention may be prepared from a coinjection of 5 layers where (starting from one side) the layers are arranged as follows: PET/MXD6/PET regrind/MXD6/PET. MXD6 is poly(m-xylylene adipamide) and acts as the performance layer with barrier properties in the 5-layer structure. In this example, the $\eta(PET)/\eta(MXD6) \leqq 2$ and $\eta(MXD6)/\eta(PET\ regrind) \leqq 2$. Preferably, each ratio is from 0.5 to 1.

In yet another embodiment, a multilayer article of this invention may be prepared from a coinjection of 5 layers where (starting from one side) the layers are arranged as follows: PET/PET regrind/MXD6/PET regrind/PET. In this example, the $\eta(PET)/\eta(MXD6) \leqq 2$ and $\eta(MXD6)/\eta(PET\ regrind) \leqq 2$. Preferably, each ratio is from 0.5 to 1. EVOH may also be the barrier or performance layer in this embodiment thereby forming a 5-layer article arranged as follows: PET/PET regrind/EVOH/PET regrind/PET. Again, the $\eta(PET)/\eta(EVOH) \leqq 2$ and $(EVOH)/\eta(PET\ regrind) \leqq 2$.

Another embodiment involves coinjecting a multilayer article such that the viscoelastic properties of the resins (i.e., viscosity and elasticity) are properly balanced to achieve the best layer thickness uniformity. In particular, the resins are chosen so that, at given processing/melt temperatures, both the viscosity ratio $\eta(A)/\eta(B)$ and the relaxation time ratio $\lambda(A)/\lambda(B)$ are approximately less than or equal to about 2 or otherwise balanced according to this invention. Most preferably, it is desired that the elasticity ratio is approximately the reciprocal of the viscosity ratio. If this condition is not met, then layer rearrangement will occur in the adapter and the thickness distribution will be altered.

An example of this is two polymers having different viscoelastic properties. As the two resins flow together down a channel, resin A gradually wraps around and "encapsulates" resin B. The longer the channel, the greater the degree of encapsulation. In coextrusion, this encapsulation generally occurs in the adapter that connects the feedblock to the die. Therefore it is important to keep the adapter length short to minimize this encapsulation. Once the encapsulated polymer reaches the die, it fans out into the full sheet width essentially "locking in" whatever distorted shape was present at the end of the adapter.

Figure 3:
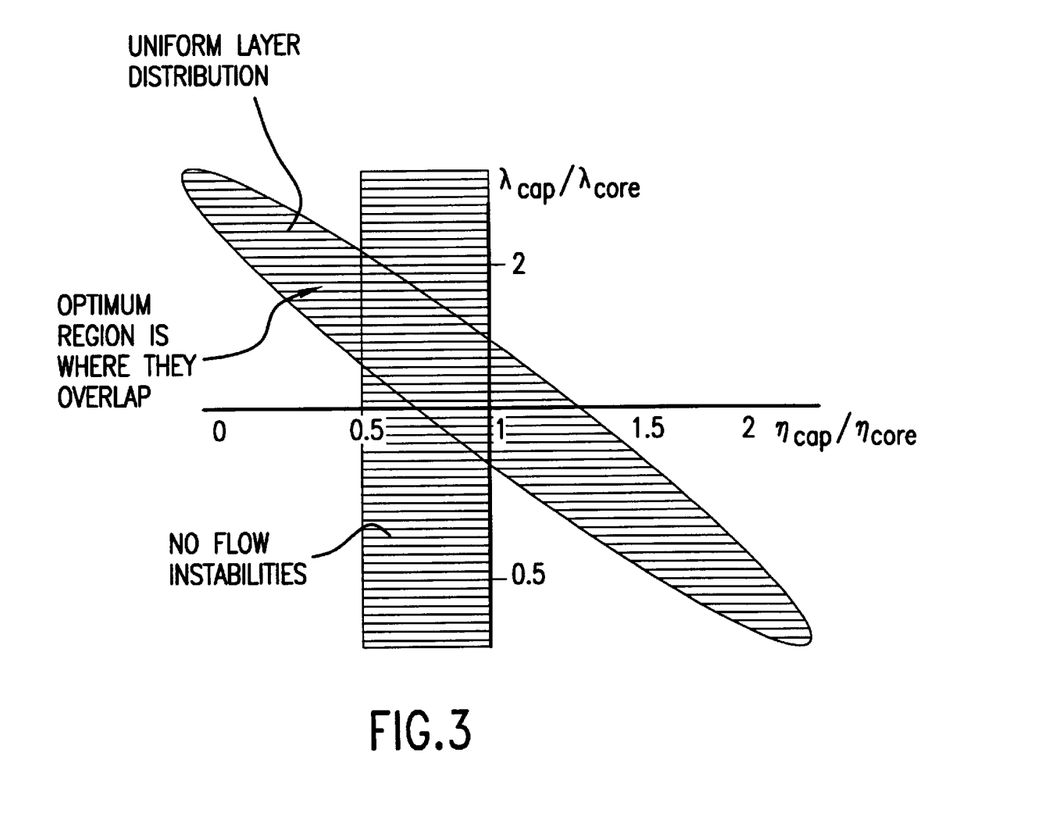
FIG. 3 is a plot of $\lambda(A)/\lambda(B)$ versus $\eta(A)/\eta(B)$ illustrating the optimum operating region for eliminating chevrons and balancing layer thickness.

To optimize the conditions to eliminate both the visual defects and the poor layer distribution, it is usually (but not always) important that both sets of conditions are simultaneously met. These "operating windows" are probably easier understood when shown graphically. FIG. 3 plots the relaxation time ratio of $\lambda_{cap}/\lambda_{core}$ versus the viscosity ratio of $\eta_{cap}/\eta_{core}$ where the "cap" resin denotes the outermost cap layer "A" and the "core" resin denotes the innermost core layer "B." For any given resins and processing temperatures, this will produce an "operating point" somewhere on the graph. For this operating point to satisfy the instability criterion of $\eta(A)/\eta(B) \leqq 2$ and more preferably $0.5 \leqq \eta(A)/\eta(B) \leqq 1$, it should fall to the left of the "y-axis" as denoted by the shaded area. For the flow to maintain layer uniformity, it is most preferable that the conditions fall approximately along a 45-degree line (from the upper left-hand corner to the lower right hand corner). The shaded ellipse in FIG. 3 depicts this region. The closer the operating point to this diagonal line, the more uniform the layer structure. As the operating point moves further away in either direction, the layer distribution becomes poorer, as depicted in the diagram.

If both uniform layer distribution and elimination of visual defects are to be obtained simultaneously, then the operating point must fall in the upper left hand quadrant along the 45 degree line (where the two operating regimes intersect). This is therefore the true optimum processing point for most coextrusion and/or coinjecting applications.

For coinjection applications, it is still desirable to meet these same criteria although the reciprocal balancing of the viscosity and elasticity ratios is for a slightly different reason. In coinjection, the problem of poor layer distribution across the width does not exist since it is a symmetrical annular flow pattern. However, as described earlier, by balancing the viscoelastic flow properties, we can help to minimize the chance of layer distortion as it flows around any bends or elbows in the connecting piping and gate.

2. Coextrusion

There are four items preferred for a coextruded article or structure:

(1) Good layer thickness distribution across the width of the sheet;

(2) The absence of interfacial flow instabilities (e.g. wavy lines, chevrons, etc.);
(3) Good layer adhesion; and
(4) Minimal curling/warping of the final film/sheet.

The method presented herein only addresses the first two items as good adhesion is more a matter of the chemistry differences between two, three or five resin layers. Poor adhesion is often corrected by a tie layer. Similarly, curling is related primarily to roll cooling conditions and is rarely a "fatal flaw".

To understand where items (1) and (2) come into play requires an understanding of a typical coextrusion feedblock and die setup for a flat film coextrusion. Depending on the feedblock plate configuration, two or three resins could be brought together to form a 2-layer A/B structure, a 3-layer A/B/A structure or a 5-layer A/B/C/B/A or structure. The 3-layer A/B/A structure, being symmetric (or "balanced") about the center plane, is the easiest to make. Non-symmetric structures are more prone to curling and warping due to the differences in thermal expansion and relaxation during cooling. Fortunately, for the purposes of eliminating flow instabilities and balancing the layer thickness, it usually does not matter whether or not the structure is symmetric.

Many coextruded multilayer embodiments are contemplated by this invention. For example, a multilayer article of this invention may be prepared from coextruding 5 layers where (starting from one side) the layers are arranged as follows: PET/EVOH/PET regrind/EVOH/PET. In this example, the $\eta(PET)/\eta(EVOH) \leq 2$ and $\eta(EVOH)/\eta(PET\ regrind) \leq 2$. Preferably, each ratio is from 0.5 to 1.

To form the above 5 layered article, $\eta(PET) \leq \eta(EVOH) \leq \eta(PET\ regrind)$. Unfortunately, this is not always easy since the regrind PET is usually at a lower I.V. (and thus lower viscosity) than the regular PET. Nevertheless, this is the optimum condition that will give the best coextruded film with no chevrons and/or instabilities. Further, since the viscosities are temperature dependent in that the viscosity decreases with increasing temperature, the various processing temperatures to help achieve the conditions above may be changed (e.g., PET regrind may run colder to increase its viscosity).

In another embodiment, a multilayer article of this invention may be prepared from coextruding 5 layers where (starting from one side) the layers are arranged as follows: PET/MXD6/PET regrind/MXD6/PET. MXD6 is poly(m-xylylene adipamide) and acts as the performance layer with barrier properties in the 5-layer structure. In this example, the $\eta(PET)/\eta(MXD6) \leq 2$ and $\eta(MXD6)/\eta(PET\ regrind) \leq 2$. Preferably, each ratio is from 0.5 to 1.

In yet another embodiment, a multilayer article of this invention may be prepared from coextruding 5 layers where (starting from one side) the layers are arranged as follows: PET/PET regrind/MXD6/PET regrind/PET. In this example, the $\eta(PET)/\eta(MXD6) \leq 2$ and $\eta(MXD6)/\eta(PET\ regrind) \leq 2$. Preferably, each ratio is from 0.5 to 1. EVOH may also be the barrier or performance layer in this embodiment thereby forming a 5-layer article arranged as follows: PET/PET regrind/EVOH/PET regrind/PET. Again, the $\eta(PET)/\eta(EVOH) \leq 2$ and $\eta(EVOH)/\eta(PET\ regrind) \leq 2$.

Layer Rearrangement and Encapsulation

The different layers are brought together inside the feedblock although how they are brought together depends on the type of feedblock (e.g., Welex, Dow, Cloeren, etc). After impingement, the layers flow side by side through the adapter and into the die. The adapter can have any of a number of different cross-sectional shapes although circular and rectangular are the most common. It is in the adapter where problems with layer thickness uniformity usually arise. If the viscosity (or as will be discussed later, the "elasticity") of A is lower than B then it will tend to wrap around or "encapsulate" B as it flows down the adapter. Similarly, if B has a lower viscosity than A, then it will try to encapsulate A. To keep this encapsulation to a minimum, it is usually recommended that the ratio of viscosities for A and B be kept less than about 2 (or greater than about 0.5). This general rule works in many instances but fails in many others. As will be discussed in the next section, this failure resulted because elasticity effects, which have previously been neglected, are as important than the viscosity effects. Thus, it becomes important to balance the elasticity and viscosity ratios simultaneously.

Interfacial Instabilities

Whereas layer rearrangement occurs primarily in the adapter region, interfacial instabilities occur primarily in the die where shear rates are higher (100 to 1000 $s^{-1}$ in the die versus 10 to 30 $s^{-1}$ in the adapter). When the shear stress at the interface between layers gets above a certain critical value, flow instabilities occur. These instabilities result in the wavy lines, chevrons, and ripples that are unacceptable for most end-use applications.

There are three main factors that contribute to high interfacial stresses and thus to flow instabilities. These are (a) thin cap layers (<10% total thickness), (b) cap layers having a viscosity which is higher than the next innermost layer and (c) overall throughput rates that are too high. In other words, interfacial instabilities are most likely to occur when thin cap layers are present, particularly if the viscosity of the cap layer is higher than the core layer. This is because shear stresses tend to be higher near the outer wall of the adapter or flow channel. For interfaces near the center of the adapter (e.g., a 50/50 A/B structure), it is very rare for flow instabilities to occur because the stresses are already low. Even for thin cap layers, if the cap layer viscosity is kept lower than the core layer, then interfacial instabilities can usually be eliminated. This is important since thin cap layers are very common.

Finally, as noted in item (c) above, another simple way to eliminate flow instabilities is to reduce the overall throughput rate through the die. This will reduce the interfacial shear stress although it may result in economically unacceptable line speeds. Reduction in throughput rate should only be used as a "tweaking" adjustment if problems arise on the line. It is better to properly select the resins in the initial design phase so that higher throughput rates can be maintained.

Elasticity in Coextrusion

Elasticity plays a role in coextrusion. Interestingly, the effect of elasticity on layer uniformity is probably more important than viscosity, which may explain why using only viscosity ratios to predict flow behavior rarely works.

The first step in understanding the effects of elasticity is to define exactly what is meant by "elasticity". Elasticity is the rubbery like behavior of the fluid—the ability for the melt to have a memory. On one extreme are materials that are purely viscous with no elasticity. Examples include water, glycerin, air, etc. On the other extreme are materials that are purely elastic with no significant viscosity. Examples of purely elastic materials include rubber bands, most metals, and solids in general. Polymer melts fall somewhere in between, being both viscous and elastic at the same time (i.e., viscoelastic).

One of the easiest methods for quantifying the viscous and elastic portions of a polymer melt is to measure the dynamic viscosity (or dynamic modulus) using a cone and plate rheometer. This method is well known to those skilled in the art and need not be described in detail herein. It is emphasized that all of these properties are functions of the effective shear rate.

As discussed above, elasticity and relaxation time are synonymous. The elasticity ratio should preferably be from about 0.5 to about 2 for coextrusion to typically be successful. Similarly, if the cap layer relaxation time is lower than the core layer, it will try to encapsulate the core Oust as if the cap layer viscosity was lower than the core layer). Likewise, if the cap layer relaxation time is higher than the core, then the core layer will try to encapsulate the cap layer. In effect, it is just as important to balance the elasticities as it is to balance the viscosities.

After defining the two key parameters for each resin, the results may be combined and predictions about the flow may be made. It turns out that interfacial instabilities and layer uniformnity/rearrangement can be treated independently during the analysis. This is preferable since there are times when some interfacial instabilities are allowed (e.g., in opaque sheet) although uniform layer distribution across the width of the sheet is critical. It is also emphasized that "good layer distribution" really depends on the application. For most applications, it is desirable to have a constant thickness of each layer across the entire width of the sheet (this minimizes edge trim). However, there are some applications where it is more desirable to have the cap layer completely encapsulate the core (in an A/B/A structure), especially when the core layer may pose some sort of hazard (even on the outer edges). One example of this might be where post-consumer recycle is the core layer (or some other non-FDA resin) in a food-contact application.

The steps for performing the coextrusion analysis for predicting flow are listed below:
1. Test each resin for a dynamic viscosity sweep (cone and plate rheometer) at 3 or more different reasonable temperatures (i.e., don not use temperatures where the resin can not be processed or will degrade excessively).
2. Determine $\eta_o$ and $\lambda$ for each resin and at each temperature.
3. Curve fit $\eta_o$ and $\lambda$ versus T using an Arrhenius plot for each resin to determine activation energies and front factors. One skilled in the art would understand without description how to fit $\eta_o$ and $\lambda$ versus T in an Arrhenius plot and as such a detailed description of this technique is not necessary. Although not required, this will make extrapolation of the results to different temperatures easier in a later part of the analysis.
4. Calculate the viscosity ratio and elasticity ratio ($\eta_{oA}/\eta_{oB}$ and $\lambda_A/\lambda_B$) as a function of melt temperature for each resin pair. By convention, the numerator of each resin represents the "outermost" layer and is the one closest to the wall. For a two-layer coextrusion structure (A/B) the outermost layer is usually taken to be the one that is thinnest.
5. Determine whether interfacial instabilities are a problem for a given melt temperature. If the cap layer is thin (less than 10%) and $\eta_{oA}/\eta_{oB}$ greater than or equal to 2, then interfacial instabilities will likely occur. It is most preferable, therefore, to keep $\eta_{oA}/\eta_{oB}$ less than or equal to 1 to prevent these instabilities.
6. Determine layer uniformity. If $\eta_{oA}/\eta_{oB}$ and $\lambda_A/\lambda_B$ are both greater than 1, then the core layer will encapsulate the cap. The degree increases the further away from 1 the ratios get. If both are less than one, then the cap will encapsulate the core. For uniform layer distribution, both ratios should be close to 1. Also, if $\eta_{oA}/\eta_{oB}$ is greater than or equal to about 1 and $\lambda_A/\lambda_B$ is less than or equal to about 1 (or vice-versa), then the encapsulation effects will offset and the layers will be roughly uniform.

Below is a discussion of some of the above steps in more detail.

Step 1: Dynamic Viscosity

Each polymer in the coextruded article or structure should be tested via standard dynamic viscosity sweeps using a cone and plate (or parallel plate rheometer) (See FIG. 1). This is a standard test. At least three or more temperatures for each resin should be run although these temperatures should represent "typical" extrusion temperatures. For example, for PET, temperatures of 260, 280 and 300° C. can be used. Below 260° C., the polymer would not melt and above 300° C., degradation becomes significant.

Step 2: Determination of $\eta_o$ and $\lambda$ for each Resin

As described previously, values for q o and k should be extracted from the dynamic viscosity data for each temperature and for each resin. The parameter $\eta_o$ is the $\eta^*$ viscosity at low shear rates. The relaxation time $\lambda$ is equal to $1/w^*$ where w* is the angular velocity where G' and G" intersect. For many resins, G' and G" will intersect "on the page" and within the plot range for w*. For some resins, however, one will have to extrapolate G' and G" off of the page in order to determine an intersection point.

Step 4: Calculation of the Viscosity and Elasticity Ratios

Once the values of $\eta_o$ and $\lambda$ are calculated for each resin and at different temperatures, it is possible to determine the viscosity and elasticity ratios as a function of melt temperature. It is often assumed that the two resins are extruded at the same melt temperature. Even if they are melted and processed at different temperatures, they will usually equilibrate to some average temperature within the feedblock and adapter so the constant temperature assumption is reasonable. This is particularly true if one layer is a very thin compared to other layers. This ratio calculation should repeated for each resin pair interface in the film.

Step 5: Determination of the Onset of Interfacial Instabilities

Interfacial instabilities will usually only occur in thin cap layers (or in thin die layers if they are close to the outer edge) when the viscosity of the cap layer is higher than the core layer (elasticity is not a significant factor here). The general rule of thumb then is that interfacial instabilities will occur when $\eta_{oA}/\eta_{oB}$ is greater than or equal to 2. Thus, to prevent the instabilities, $\eta_{oA}/\eta_{oB}$ is preferably less than or equal to 2. How much lower than 2 really depends on the throughput rate and the thickness of the cap layer A. For very thin cap layers and/or high line speeds, $\eta_{oA}/\eta_{oB}$ is less than or equal to 2 and should most preferably be less than about 1. Having a low viscosity cap layer serves as a sort of lubricant which minimizes pumping pressures as well as eliminating interfacial instabilities. The disadvantage of having a low viscosity cap layer is that it will tend to encapsulate the core resin.

Step 6: Determination of Layer Uniformity

Proper determination of layer uniformity across the width of the sheet requires knowledge of both the viscosity and elasticity ratios. Also the type of coextrusion where uniformity may be a problem is for flat film dies whereas annular dies (e.g., blown film, pipe, preform molding) will not exhibit the same across the width variability.

If the calculations for the initial resins result in unacceptable operating conditions, it is still possible to correct the problem. A number of ways to do this are described below. These techniques apply to coinjection and coextrusion.

Changing the Molecular Weight (or I.V.)

The first, and most logical method is to change the molecular weight (or I.V.) of one of the resins. This is because $\eta_o$ is proportional to $M_W^{3.4}$ (or $\eta_o$ is proportional to I.V.$^{5.1}$). The relaxation time $\lambda$ also follows the same $M_W$ (or I.V.) dependence. So, for example, by increasing the I.V./$M_w$ of one of the resins, we change both $\eta_{oA}/\eta_{oB}$ and $\lambda_A/\lambda_B$ in a similar manner. Thus, if we increase the cap layer $M_w$, both $\eta_{oA}/\eta_{oB}$ and $\lambda_A/\lambda_B$ will increase. Similarly, decreasing the cap layer $M_w$ will cause the operating point to decrease. Changing the core layer viscosity (resin B), has a similar effect although the directions are reversed. Often the choice of whether to vary the cap or core layer molecular weight is restricted by what resin formulations are commercially available.

Adding a Branching/Crosslinking Agent

Changing the $M_w$ or I.V. of one of the resins causes both $\eta_{oA}/\eta_{oB}$ and $\lambda_A/\lambda_B$ to change in the same direction. There are situations where this is not desirable and it is preferred to change the elasticity and viscosity ratios independently. Adding a brancher/crosslinking primarily affects the elasticity and is therefore a nice method for varying $\lambda_A/\lambda_B$ without significantly altering $\eta_{oA}/\eta_{oB}$ For polyesters, this brancher might be a typical multifunctional branching agent like trimellitic anhydride (TMA) or pyromellitic dianhydride (PMDA). For polyethylene, blending in LDPE (assuming either LLDPE or HDPE is being used) can increase the branching.

Changing the Melt Temperatures

Up until now, it has generally been assumed that the two resins are at the same melt temperature. This is not an unreasonable assumption since some thermal equilibration will occur in the feedblock, adapter and die. Still it is possible to run the polymers at slightly different melt temperatures (usually 25° C. is considered the maximum temperature differential). Running a polymer at a slightly different temperature has the same effect as if the $M_w$ had been changed. For example, if the cap layer is at a slightly hotter temperature, its elasticity and viscosity are reduced relative to the nominal melt temperature. This shifts the operating point along the same diagonal line associated with changing $M_w$/I.V.

If different temperatures, are used, it is necessary to modify (5) slightly since viscosities and relaxation times must be extracted for each polymer at the appropriate temperature. The simplest approach is to use (4), plugging in the appropriate temperatures for each resin, and then manually calculating the ratios. While changing melt temperatures has the same effect as changing I.V./$M_w$, the effects are not as significant. Therefore, varying the melt temperature should only be used as an online "tweaking" adjustment.

Changing the Feedblock Design

Cutting metal is always considered a last resort and is usually on applied when layer uniformity is unacceptable and no other modification seems to work. Typically, as with a Welex block, a flow plate is altered so that when the resins impinge on one another there is some compensation for the encapsulation. For example, if the cap layer is encapsulating the core, the flow plate is modified so that when the layers first impinge, the core layer is partially wrapped around the cap by an equal amount. As the resins flow towards the die, the cap layer will still try to flow around the core.

However, another approach to minimizing the amount of encapsulation is to shorten the adapter length. A long adapter provides more time for the resins to rearrange before reaching the die. The Cloeren multi-manifold die takes this approach to an extreme since the layers are literally brought together inside the die with no real adapter to speak of. The Cloeren die is expensive but useful when viscosity ratios (or elasticity ratios) are extreme. Layer rearrangement may still want to occur, but is not given enough time to actually happen.

3. Structural Layer

In accordance with the present invention, and in a preferred embodiment, the structural layer comprises one or more polymers that provide the mechanical and physical properties required of a package material or article. Suitable polymers comprise, but are not limited to, any polyester homopolymer or copolymers that are suitable for use in packaging, and particularly food packaging. The more preferred polyester is PET, including PET regrind.

Suitable polyesters useful in the present invention are generally known in the art and may be formed from aromatic dicarboxylic acids, esters of dicarboxylic acids, anhydrides of dicarboxylic esters, glycols, and mixtures thereof. Suitable partially aromatic polyesters are formed from repeat units comprising terephthalic acid, dimethyl terephthalate, isophthalic acid, dimethyl isophthalate, dimethyl-2,6 naphthalenedicarboxylate, 2,6-naphthalenedicarboxylic acid, 1,2-, 1,3- and 1,4-phenylene dioxydoacetic acid, ethylene glycol, di ethylene glycol, 1,4-cyclohexane-di methanol, 1,4-butanediol, and neopentyl glycol mixtures thereof.

Preferably, the structural polyesters comprise repeat units comprising terephthalic acid, dimethyl terephthalate, isophthalic acid, dimethyl isophthalate, and/or dimethyl-2,6-naphthalenedicarboxylate. The dicarboxylic acid component of the polyester may optionally be modified with one or more different dicarboxylic acids (preferably up to about 20 mole %). Such additional dicarboxylic acids comprise aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acids to be comprised with terephthalic acid are: phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, mixtures thereof and the like.

In addition, the glycol component may optionally be modified with one or more different diols other than ethylene glycol (preferably up to about 20 mole %). Such additional diols comprise cycloaliphatic diols preferably having 6 to 20 carbon atoms or aliphatic diols preferably having 25 to 20 carbon atoms. Examples of such diols comprise: diethylene glycol, triethylene glycol, 1,4-cyclohexanedimethanol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl) propane, 2-bis-(4-hydroxypropoxyphenyl)-propane, hydroxyethyl resorcinol, mixtures thereof and the like. Polyesters may be prepared from two or more of the above diols.

The resin may also contain small amounts of trifunctional or tetrafunctional comonomers such as trimellitic anhydride, trimethylolpropane, pyromellitic dianhydride, pentaerythritol, and other polyester forming polyacids or polyols generally known in the art.

4. Performance Layer

At least one layer in a multilayer article of the present invention is a performance layer and provides the resulting article with improved physical properties. Such properties comprise, but are not limited to, barrier to migration (gas, vapor, and/or other small molecules), barrier to harmful light (ultraviolet light) and mechanical properties such as heat resistance.

In one embodiment, a multilayer article of the present invention where the performance layer is a barrier layer displays improved $CO_2$ and/or $O_2$ barrier compared to an article of unmodified PET homopolymer. In other embodiments, all of the layers are modified to display improved properties. Suitable materials for the barrier layers of the present invention comprise polyamides, ethylene-vinyl acetate copolymer (EVOH), polyalcohol ethers, wholly aromatic polyesters, resorcinol diacetic acid-based copolyesters, polyalcohol amines, isophthalate containing polyesters, PEN and its copolymers and mixtures thereof. Barrier materials may be used neat or may be modified to further improve barrier, such as with the addition of platelet particles, preferably layered clay material, such as those available from Nanocor, Southern Clay Products, Rheox and others.

Suitable polyamides comprise partially aromatic polyamides, aliphatic polyamides, wholly aromatic polyamides and mixtures thereof By "partially aromatic polyamide," it is meant that the amide linkage of the partially aromatic polyamide contains at least one aromatic ring and a nonaromatic species.

Suitable polyamides preferably have a film-forming molecular weight. Wholly aromatic polyamides preferably comprise, in the molecule chain, at least 70 mole % of structural units derived from m-xylylene diamine or a xylylene diamine mixture comprising m-xylylene diamine and up to 30% of p-xylylene diamine and an aliphatic dicarboxylic acid having 6 to 10 carbon atoms. These wholly aromatic polyamides are further described in Japanese Patent Publication Nos. 1156/75, 5751/75, 5735/75 and No. 10196/75, and Japanese Patent Application Laid-Open Specification No. 29697/75.

Polyamides formed from isophthalic acid, terephthalic acid, cyclohexanedicarboxylic acid, meta- or para-xylylene diamine, 1,3- or 1,4-cyclohexane(bis)methylamine, aliphatic diacids with 6 to 12 carbon atoms, aliphatic amino acids or lactams with 6 to 12 carbon atoms, aliphatic diamines with 4 to 12 carbon atoms, and other generally known polyamide forming diacids and diamines can be used. The low molecular weight polyamides may also contain small amounts of trifunctional or tetrafunctional comonomers such as trimellitic anhydride, pyromellitic dianhydride, or other polyamide-forming polyacids and polyamines known in the art.

Preferred partially aromatic polyamides comprise: poly (m-xylylene adipamide), poly(hexamethylene isophthalamide), poly(hexamethylene adipanide-co-isophthalamide), poly(hexamethylene adipamide-co-terephthalamide), and poly(hexamethylene isophthalamide-co-terephthalamide). The most preferred partially aromatic polyamide is poly(m-xylylene adipamide).

Preferred aliphatic polyamides comprise poly (hexamethylene adipamide) and poly(caprolactam). The most preferred aliphatic polyamide is poly(hexamethylene adipamide). Partially aromatic polyamides are preferred over the aliphatic polyamides where good thermal properties are crucial.

Preferred aliphatic polyamides comprise polycapramide (nylon 6), poly-aminoheptanoic acid (nylon 7), poly-aminononanoic acid (nylon 9), polyundecane-amide (nylon 11), polyarylactam (nylon 12), polyethylene-adipamide (nylon 2,6), polytetramethylene-adipamide (nylon 4,6), polyhexamethylene-adipamide (nylon 6,6), polyhexamethylene-sebacamide (nylon 6,10), polyhexamethylene-dodecamide (nylon 6,12), polyoctamethylene-adipamide (nylon 8,6), polydecamethylene-adipamide (nylon 10,6), polydodecamethylene-adipamide (nylon 12,6) and polydodecamethylene-sebacamide (nylon 12,8).

Suitable polyalcohol ethers comprise the phenoxy resin derived from reaction of hydroquinone and epichlorohydrin as described in U.S. Pat. Nos. 4,267,301 and 4,383,101. These materials can also contain resorcinol units and may in fact be all resorcinol units as opposed to hydroquinone units for the aromatic residue.

Suitable wholly aromatic polyesters (frequently called LCPs) are formed from repeat units comprising terephthalic acid, isophthalic acid, dimethyl-2,6-naphthalenedicarboxylate, 2,6-naphthalenedicarboxylic acid, hydroquinone, resorcinol, biphenol, bisphenol A, hydroxybenzoic acid, hydroxynaphthoic acid and the like.

Diacetic resorcinol copolymers are described in U.S. Pat. Nos. 4,440,922 and 4,552,948 and consist of copolyesters of terephthalic acid, ethylene glycol and a modifying diacid from 5 to 100 mol % in the composition replacing terephthalate units. The modifying diacid is either m-phenylenoxydiacetic acid or p-phenylenoxydiacetic. Either one of these diacids can be employed either by themselves or as mixtures in preparation of copolyesters for this invention.

Suitable polyalcohol amines comprise those derived from reaction of either resorcinol bisglycidyl ether with an alkanol amine, such as ethanolamine, or hydroquinone bisglycidyl ether with an alkanol amine. Mixtures of these bisglycidyl ethers can obviously also be used in preparation of a copolymer.

Suitable isophthalate-containing polyesters comprise polyesters comprising repeat units derived from at least one carboxylic acid comprising isophthalic acid (preferably at least 10 mole %) and at least one glycol comprising ethylene glycol.

Suitable poly(ethylene naphthalate) (PEN) and PEN copolymers comprise polyesters comprising repeat units derived from at least one carboxylic acid comprising naphthalene dicarboxylic acid (preferably at least 10 mole %) and at least one glycol comprising ethylene glycol.

The most preferred performance layer for barrier is a saponified ethylene-vinyl acetate copolymer (EVOH). The saponified ethylene-vinyl acetate copolymer is a polymer prepared by saponifying an ethylene-vinyl acetate copolymer having an ethylene content of 15 to 60 mole % up to a degree of saponification of 90 to 100%.

The EVOH copolymer should have a molecular weight sufficient for film formation, and a viscosity of generally at least 0.01 dL/g, especially at least 0.05 dL/g, when measured at 300° C. in a phenol/water solvent (85 wt. %: 15 wt. %).

Conventional processes all of which are well known in the art, and need not be described here can make the polymers of the present invention.

Although not required, additives normally used in polymers may be used, if desired. Such additives comprise colorants, pigments, carbon black, glass fibers, impact modifiers, antioxidants, surface lubricants, denesting agents, UV light absorbing agents, metal deactivators, fillers, nucleating agents, stabilizers, flame retardants, reheat aids, crystallization aids, acetaldehyde reducing compounds, recycling release aids, oxygen scavenging materials, or mixtures thereof, and the like.

All of these additives and many others and their use are known in the art and do not require extensive discussion. Therefore, only a limited number will be referred to, it being understood that any of these compounds can be used in any combination of the layers so long as they do not hinder the present invention from accomplishing its objects.

Shaped, multilayer articles according to this invention comprise film, sheet, tubing, pipe, profiles, preforms and containers such as bottles, trays, cups and the like.

EXAMPLE

The following examples and experimental results are comprised to provide those of ordinary skill in the art with a complete disclosure and description of particular manners in which the present invention can be practiced and evaluated, and are intended to be purely exemplary of the invention and are not intended to limit the scope of what the inventors regard as their invention. Efforts have been made to ensure accuracy with respect to numbers (e.g., amounts, temperature, etc.); however, some errors and deviations may have occurred. Unless indicated otherwise, parts are parts by weight, temperature is in °C. or is at ambient temperature, and pressure is at or near atmospheric.

Example 1
Coinjection of Various Grades of PET with EVOH as the Barrier Layer Three different grades of PET were evaluated for use in a coinjection trial with EVALCA EVOH grade F-101. The PET resins are tabulated below in Table 1. Each has a different I.V. and the level of CHDM copolymer modification varied slightly between them as shown. The higher the I.V. of the resin, the greater the viscosity and elasticity (the copolymer modification has only a minor effect).

TABLE 1

| PET Sample | I.V. (dL/g) | Copolymer Modification Level |
|---|---|---|
| #1 | 0.71 | Moderate |
| #2 | 0.77 | High |
| #3 | 0.80 | High |

A 5-layer structure was coinjected consisting of PET/ EVOH/PET/EVOH/PET. The EVOH layer was relatively close to the outside of the structure (i.e., near the wall) so interfacial stresses are expected to be high. Barrel temperatures for the PET samples were nominally 285° C. whereas the barrel temperatures for the EVOH were 185° C. However, heat transfer calculations show that because the EVOH layer is so thin, and is surrounded by the hotter PET, that it quickly reaches a temperature of approximately 170° C. This temperature was used to estimate $\eta$ and $\lambda$. The operating points for each of these three PET resins with PET were determined according to this invention. Only Resin #1 is predicted to have both good uniform layer distribution and no instabilities/chevrons.

An injection molding trial was held using samples #1 and #2. Previous attempts with sample #3 had already shown that it would not work without causing chevrons. Under identical molding conditions, parts molded using sample #1 were free of chevrons whereas the parts molded with sample #2 had a visible flow defects in the form of chevrons.

Example 2
Determination of an Optimum Coextrusion Window for an Cap/Core/Cap Layer Coextrusion of polyethylene onto PETG 6763

A thin layer of polyethylene (Eastman Chemical Company CM 27057-F (2.0 MI)) was coextruded onto both sides of a PETG 6763 sheet. PETG 6763 is a copolyester commonly used in the film and sheeting industry and has an IV=0.76 dl/g (as measured in 60 wt. %/40 wt. % phenol/ tetrachloroethane at 25° C.). The total thickness was approximately 40 mils with the polyethylene cap layers being 10% of the thickness each. The film width was approximately 20 inches. The fact that the cap layers are thin makes interfacial instabilities a distinct possibility. The polyethylene (PE) had a melt index of 2.0. Dynamic viscosity measurements were performed at 220, 240 and 260° C. for the PETG and 230, 250 and 270° C. for the polyethylene and the values for $\eta$ and $\lambda$ extracted at each temperature. These values were plotted along with the Arrhenius curve fit. Based upon the plot, the viscosity of the PETG is higher at lower temperatures but becomes lower above about 235° C. Because both of these resins can be processed over a wide range of melt temperatures (from about 200° C. to 300° C.), it was desired to find the best set of temperatures to optimize the process.

To test the method for optimizing conditions, a designed experiment was performed around the PE and PETG melt temperatures. The run conditions were as follows in Table 2:

TABLE 2

| Run # | T(Polyethylene) | T(PETG) |
|---|---|---|
| 1 | 210° C. | 210° C. |
| 2 | 210° C. | 260° C. |
| 3 | 260° C. | 260° C. |
| 4 | 260° C. | 210° C. |
| 5 | 235° C. | 235° C. |

Figure 4:
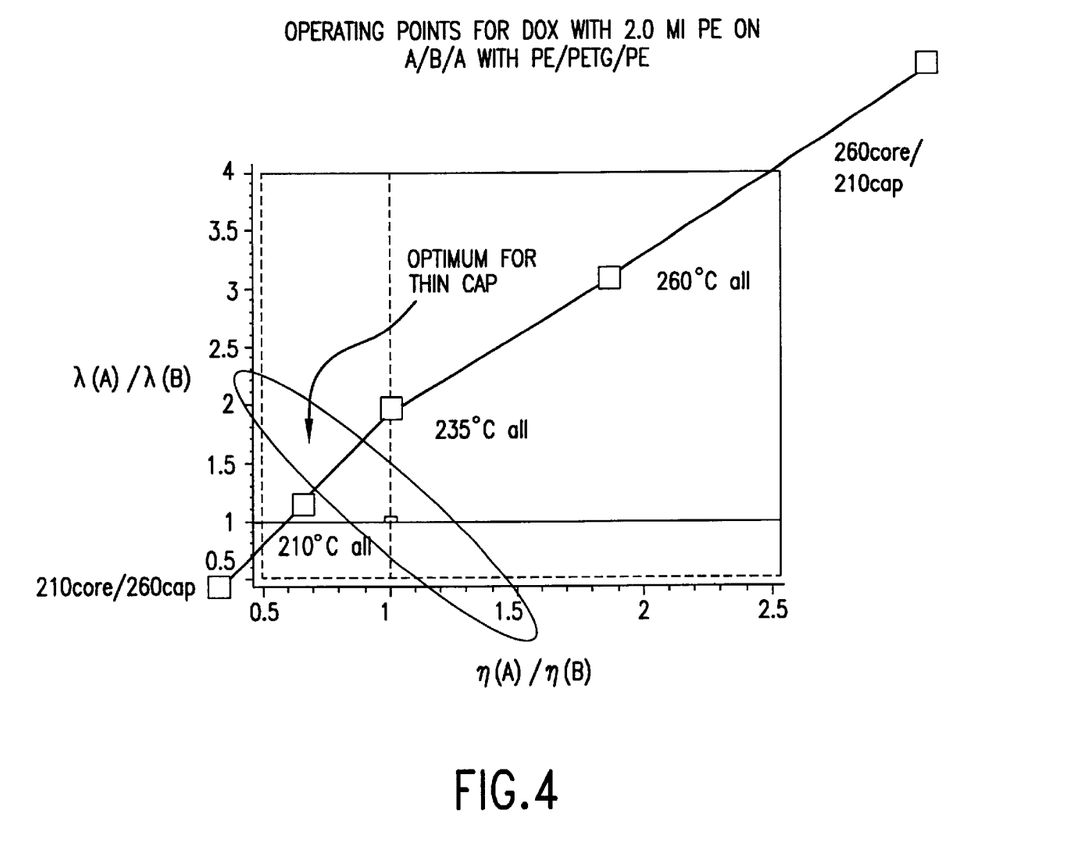
FIG. 4 is a plot of $\lambda(A)/\lambda(B)$ versus $\eta(A)/\eta(B)$ for an A/B/A coextrusion of a PE (polyethylene) cap layer onto a PETG (polyethylene terephthalate-G) core layer. The points refer to the different combinations of processing temperatures as outlined in Example 1.

This provided a spread of temperatures covering a range of possible processing conditions. The viscosity ratio and elasticity ratio (PE over PETG since PE is the outermost layer) was determined for each of the runs above according to the method outlined in the detailed description (See FIG. 4). Runs 1 and 5 will probably give the best layer uniformity since they are closest to the layer thickness optimum. As one moves to the lower left in FIG. 4 (e.g. run 4), it is predicted that the thickness of the cap layer will get thicker near the edges and thinner near the middle. As one moves to the upper right hand corner of FIG. 4 (e.g. run 2), just the opposite is predicted to occur.

Because the PE has poor adhesion to the PETG, it was possible to peel apart the layers and measure the thickness across the width. The cap layer thickness was found to go from being thick on the edges to thick in the middle as one moves from the lower left hand corner to the upper right hand corner in FIG. 4. Similarly, there is a crossover in the thickness distribution at the same location that the optimum process condition is predicted (between run 1 and run 5). Based on the model, it is predicted that the optimum run conditions be when both extruders are set at about 220° C. This prediction is verified by the experimental data.

Example 3
Determination of the Optimum Grade of Polyethylene to Be Coextruded with PETG at 235° C.

In this example, the extrusion temperature was fixed at 235° C. for both the PE and the PETG. Otherwise, the coextrusion equipment and conditions were the same as Example 2. Three different PE's were evaluated including Eastman Chemical Company PE's: CM-27053-F (0.9 MI), CM-27057-F (2.0 MI) and CM-27058-F (3.2 MI). The higher the melt index (MI), the lower the molecular weight of the resin. This lowering of the molecular weight also correspondingly causes a decrease in both the viscosity and elasticity.

Figure 5:
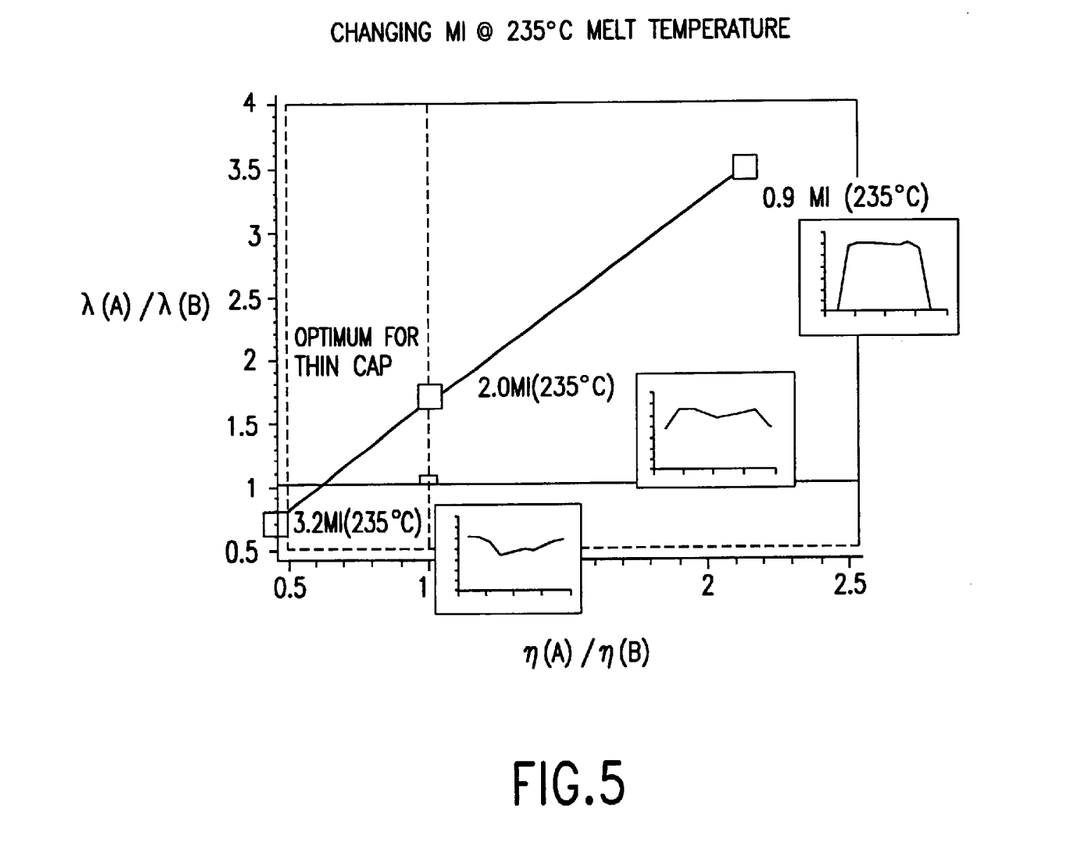
FIG. 5 is a plot of $\lambda(A)/\lambda(B)$ versus $\eta(A)/\eta(B)$ for an A/B/A coextrusion of a PE (polyethylene) cap layer onto a PETG (polyethylene terephthalate-G) core layer. Extrusion temperatures for both layers were held constant at 235° C. and the PE melt index varied from 0.9 to 3.2.

The operating points for these three resins coextruded onto PETG at 235° C. are shown in FIG. 5. In addition, a small insert graph at each point shows the thickness distribution of the PE cap layer for each value of MI. As with changing the melt temperature in Example 2, changing the MI for the PE from high to low causes the layer distribution of the cap layer to go from being heavy on the outer edges, to heavy in the middle. The optimum value of MI for uniform layer distribution is predicted to be around 2.2 to 2.4. Nevertheless, the 2.0 melt index sample, which was closest to the optimum area, was also the best looking sample. In addition, the 0.9 MI sample had small chevrons present as predicted by the model.

Example 4
Coextrusion of Eastman PET 9921 with a 5% Cap Layer of MAKROLON 2608 Polycarbonate A multilayer structure of PET with a thin cap layer of polycarbonate (PC) was coextruded. The polycarbonate added surface gloss and also helps to stiffen the polymer since it softens at a higher temperature (the glass transition temperature of PET is 80° C. and for polycarbonate it is 150° C. Because the cap layer is thin, the formation of interfacial instabilities is a significant problem.

Figure 6:
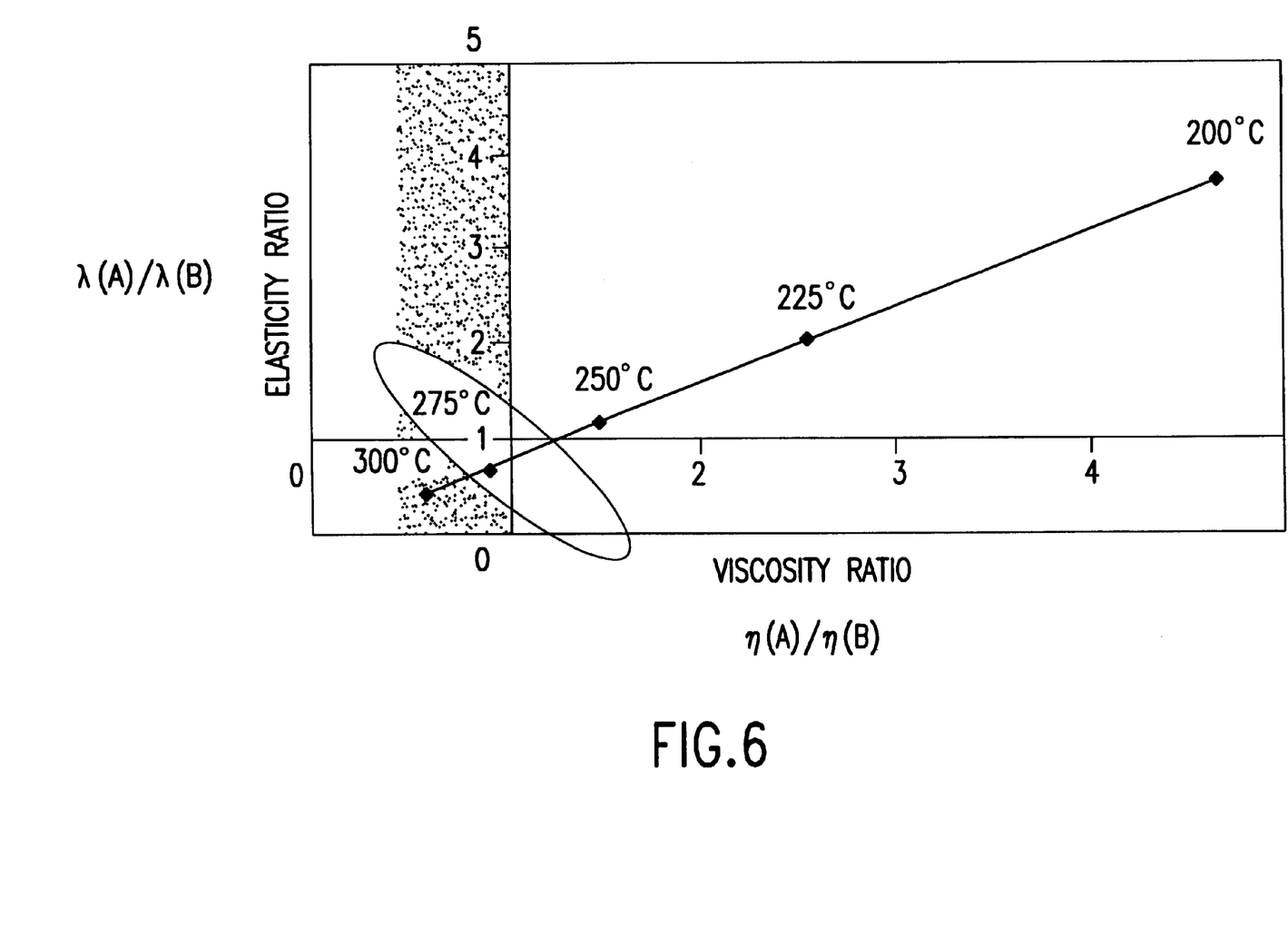
FIG. 6 is a plot of $\lambda(A)/\lambda(B)$ versus $\eta(A)/\eta(B)$ for an A/B/A coextrusion of a PC (polycarbonate) cap layer onto a PET (polyethylene terephthalate) core layer. Extrusion temperatures for both layers were different.

FIG. 6 shows the operating points for different extrusion temperatures (the PET and PC temperatures were set the same). Below a processing temperature of 275° C., instabilities are predicted to occur. Extrusion trials on a 2.5" extruder with a 24" film die confirmed this. The processing temperature had to be set at 290° C. or higher in order to eliminate the chevrons. This corresponds on the plot to a viscosity ratio around 0.75 as would be expected for a relatively thin cap layer. Layer uniformity was generally good as predicted by the model.

Example 5
Five Layer Coextrusion of PET and MXD6

A 5 layer A/B/C/B/A coextrusion test was setup using small Killion laboratory scale extruders to simulate what occurs in a five-layer coinjection process and also determine where best to place the various layers. The PET resins used in the experiment were Eastman PET 9921 (0.80 IV) and Eastman PET 20007 (0.72 IV) and the nylon was MXD6 6007. The Eastman PET 20007 was selected to represent an IV typical of regrind material. It is the lowest viscosity resin of the three resins at 280° C. Similarly, the MXD6 6007 has the highest viscosity of the three resins at 280° C. Therefore, the ideal structure to minimize chevrons based on the viscosity criterion would be to have the Eastman PET 20007 as the outer (A) layer, the PET 9921 as the intermediate (B) layer and the MXD6 as the core (C) layer.

As part of the experiment and to test this hypothesis, the various resins were placed in the A, B, and C layers in various, but not exhaustive combinations as shown in Table 3 below. The B and C extruders were 1" extruders although their maximum outputs were different (C had a maximum RPM of 57 whereas B had a maximum RPM of 107). The A extruder was a 1.25" extruder. All extruders, the feedblock and die were set at 280° C. The screw RPM for each extruder, which roughly correlates with the throughput rate, is also shown in Table 3. Chevrons occurred when the A cap layer thickness was very small ($\leq$10%) and only runs in this thickness range are shown below.

The best films (runs 10 and 11) occurred when the higher viscosity MXD6 was at or near the center of the film. The worst chevron-filled films occurred when the MXD6 was the outer cap layer (layer A). This is in agreement with the predictions of the viscosity criterion. It further suggests that a 5 layer coinjected preform consisting of PET/regrind/MXD6/regrind/PET might be more stable than the current PET/MXD6/regrind/MXD6/PET structure, particularly if a lower IV PET is used for the structural resin (compare, for example, runs 11 and 9).

TABLE 3

| Run# | Layer A | Layer B | Layer C | Summary of Film Quality |
|---|---|---|---|---|
| 6 | MXD6 (12 rpm) | 20007 (100 rpm) | 20007 (57 rpm) | chevrons on the surface towards the middle of the film |
| 7 | MXD6 (12 rpm) | 9921 (100 rpm) | 20007 (57 rpm) | mild chevrons but larger than in run 6 |
| 8 | MXD6 (12 rpm) | 9921 (100 rpm) | 9921 (57 rpm) | severe chevrons |
| 7 repeat | MXD6 (12 rpm) | 9921 (100 rpm) | 20007 (57 rpm) | chevrons a little bit worse than in original run 7 |
| 9 | 20007 (15 rpm) | MXD6 (100 rpm) | 20007 (57 rpm) | chevrons formed and disappeared in a periodic fashion |
| 10 | 20007 (15 rpm) | MXD6 (100 rpm) | MXD6 (57 rpm) | minimal if any chevrons |
| 11 | 20007 (15 rpm) | 20007 (100 rpm) | MXD6 (57 rpm) | good film, no chevrons |
| 9 repeat | 20007 (15 rpm) | MXD6 (100 rpm) | 20007 (57 rpm) | fairly clear with few chevrons |

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A process for coinjection-molding a multilayer article comprising:
   coinjection-molding at a selected coinjecting temperature
   (i) a first outer polymer resin layer comprising at least one structural polymer resin having a viscosity and an elasticity at the selected coinjecting temperature, and
   (ii) a second inner polymer resin layer comprising at least one performance polymer resin having a viscosity and an elasticity at the selected coinjecting temperature, wherein the ratio of the structural polymer resin viscosity to the performance polymer resin viscosity at the coinjecting temperature is less than or equal to about 1 and wherein the ratio of the structural resin elasticity to the performance resin elasticity is approximately the reciprocal of the viscosity ratio.

2. The process of claim 1, wherein component (i) comprises a polyester.

3. The process of claim 2, wherein the polyester is a homopolymer or a copolymer.

4. The process of claim 1, wherein component (i) comprises an aromatic polyester comprising repeat units of terephthalic acid, dimethyl terephthalate, isophthalic acid, dimethyl isophthalate, dimethyl-2,6 naphthalenedicarboxylate, 2,6-naphthalenedicarboxylic acid, 1,2-, 1,3- or 1,4-phenylene dioxydoacetic acid, ethylene glycol, diethylene glycol, 1,4-cyclohexanedimethanol (1,4-CHDM), 1,4-butanediol, neopentyl glycol or mixtures thereof.

5. The process of claim 1, wherein component (i) comprises poly(ethylene terephthalate) or a copolymer thereof.

6. The process of claim 1, wherein component (ii) is a barrier resin.

7. The process of claim 1, wherein component (ii) comprises a polyamide or a copolymer thereof, an ethylene-vinyl acetate copolymer (EVOH), a polyalcohol ether, a wholly aromatic polyester, a resorcinol diacetic acid-based copolyester, a polyalcohol amine, an isophthalate-containing polyester, poly(ethylene naphthalate) or a copolymer thereof, or a mixture thereof.

8. The process of claim 7, wherein component (ii) comprises the polyamide and the polyamide comprises a partially aromatic polyamide, an aliphatic polyamide, a wholly aromatic polyamide, or a mixture thereof.

9. The process of claim 1, wherein component (ii) comprises a saponified ethylene-vinyl acetate copolymer (EVOH).

10. The process of claim 1, wherein component (i) comprises poly(ethylene terephthalate) or a copolymer thereof, component (ii) comprises an ethylene-vinyl acetate copolymer (EVOH), and the ratio of the component (i) viscosity to the component (ii) viscosity at the selected coinjecting temperature is less than or equal to about 1 and greater than or equal to about 0.5.

11. The process of claim 1 comprising coinjection-molding at least three polymers at the selected coinjecting temperature thereby forming a five layer article wherein at each polymer resin interface the ratio of the outermost polymer resin viscosity to the next innermost polymer resin viscosity at the coinjecting temperature is less than or equal to about 1 and the elasticity ratio for each interface is approximately the reciprocal of the viscosity ratio at that same interface.

12. A process for coinjection-molding a 5-layer article comprising:

coinjection-molding at a selected coinjecting temperature (i) two outer polymer resin layers comprising at least one outer polymer resin each having a viscosity and an elasticity at the selected coinjecting temperature, and (ii) two intermediate polymer resin layers disposed between a core layer and the two outer layers, the two intermediate polymer resin layers comprising at least one intermediate polymer resin each having a viscosity and an elasticity at the selected coinjecting temperature, and (iii) a core layer comprising a core polymer resin having a viscosity at the selected coinjecting temperature, wherein at each polymer resin interface the ratio of the outermost polymer resin viscosity to the next innermost polymer resin viscosity is less than or equal to about 1 and the elasticity ratio for each interface is approximately the reciprocal of the viscosity ratio at that same interface.

13. The process of claim 12, wherein at each interface of the five layers the ratio of the outermost polymer resin viscosity to the next innermost polymer resin viscosity at the coinjecting temperature is less than or equal to about 1 and greater than or equal to about 0.5.

14. The process of claim 12, wherein component (i) comprises a structural polymer resin having a structural resin viscosity at the selected coinjecting temperature.

15. The process of claim 12, wherein component (ii) comprises a structural polymer resin having a structural resin viscosity at the selected coinjecting temperature.

16. The process of claim 12, wherein component (ii) comprises a performance polymer resin having a performance resin viscosity at the selected coinjecting temperature.

17. The process of claim 12, wherein component (iii) comprises a structural polymer resin having a structural resin viscosity at the selected coinjecting temperature.

18. The process of claim 12, wherein component (iii) comprises a performance polymer resin having a performance resin viscosity at the selected coinjecting temperature.

19. The process of claim 12, wherein component (i) comprises a structural polymer resin having a structural resin elasticity, component (ii) comprises a structural polymer resin having a structural resin elasticity and component (iii) comprises at least one performance polymer resin having a performance resin elasticity, and at each interface of the five layers the ratio of the outermost polymer resin elasticity to the next innermost polymer resin elasticity at the coinjecting temperature is approximately the reciprocal of the viscosity ratio.

20. The process of claim 12, wherein components (i) and (ii) comprise a polyester.

21. The process of claim 12, wherein components (i) and (ii) comprise an aromatic polyester comprising repeat units of terephthalic acid, dimethyl terephthalate, isophthalic acid, dimethyl isophthalate, dimethyl-2,6 naphthalenedicarboxylate, 2,6-naphthalenedicarboxylic acid, 1,2-, 1,3- or 1,4-phenylene dioxydoacetic acid, ethylene glycol, diethylene glycol, 1,4-cyclohexanedimethanol (1,4-CHDM), 1,4-butanediol, neopentyl glycol or mixtures thereof.

22. The process of claim 12, wherein component (i) comprises poly(ethylene terephthalate) or a copolymer thereof.

23. The process of claim 12, wherein component (ii) comprises poly(ethylene terephthalate) regrind.

24. The process of claim 12, wherein component (iii) is a barrier resin.

25. The process of claim 12, wherein component (iii) comprises a polyamide or a copolymer thereof, an ethylene-vinyl acetate copolymer (EVOH), a polyalcohol ether, a wholly aromatic polyester, a resorcinol diacetic acid-based copolyester, a polyalcohol amine, an isophthalate-containing polyester, poly(ethylene naphthalate) or a copolymer thereof, or a mixture thereof.

26. The process of claim 12, wherein the polyamide comprises a partially aromatic polyamide, an aliphatic polyamide, a wholly aromatic polyamide, or a mixture thereof.

27. The process of claim 12, wherein component (iii) comprises a saponified ethylene-vinyl acetate copolymer (EVOH) or poly(m-xylylene adipamide).

28. The process of claim 12, wherein component (i) comprises poly(ethylene terephthalate) or a copolymer thereof, component (ii) comprises poly(ethylene terephthalate) regrind and component (iii) comprises poly(m-xylene adipamide), and at each polymer resin interface the ratio of the outermost polymer resin viscosity to the next innermost polymer resin viscosity at the coinjecting temperature is less than or equal to about 1.

* * * * *